(12) United States Patent
Hershey et al.

(10) Patent No.: US 12,547,932 B2
(45) Date of Patent: Feb. 10, 2026

(54) MACHINE LEARNING-ASSISTED MULTI-DOMAIN PLANNING

(71) Applicant: Raytheon Company, Arlington, VA (US)

(72) Inventors: Paul C. Hershey, Ashburn, VA (US); Brian David Scarpiniti, Lower Burrell, PA (US)

(73) Assignee: Raytheon Company, Arlington, VA (US)

( * ) Notice: Subject to any disclaimer, the term of this patent is extended or adjusted under 35 U.S.C. 154(b) by 1060 days.

(21) Appl. No.: 17/508,450

(22) Filed: Oct. 22, 2021

(65) Prior Publication Data

US 2023/0132315 A1 Apr. 27, 2023

(51) Int. Cl.
*G06N 20/00* (2019.01)

(52) U.S. Cl.
CPC .................................... *G06N 20/00* (2019.01)

(58) Field of Classification Search
CPC ............ G06N 20/00; G06N 5/01; G06N 7/01; G06N 20/10; G06Q 50/26; G06Q 10/063
See application file for complete search history.

(56) References Cited

U.S. PATENT DOCUMENTS

| 2021/0078735 A1* | 3/2021 | Kapp | G06N 3/0495 |
| 2022/0108622 A1* | 4/2022 | Derickson | G09B 19/00 |
| 2022/0335518 A1* | 10/2022 | Wellmann | G06F 9/547 |

* cited by examiner

*Primary Examiner* — Kamran Afshar
*Assistant Examiner* — Kyle Allman Thompson
(74) *Attorney, Agent, or Firm* — Schwegman Lundberg & Woessner, P.A.

(57) ABSTRACT

Techniques for machine learning-assisted multi-domain planning are disclosed, including: receiving first situational data from a first domain and second situational data from a second domain; receiving first user input indicating an objective; applying at least the first situational data, the second situational data, and the objective to a machine learning model, to obtain one or more suggested courses of action for satisfying the objective using assets selected from a plurality of assets available in the first domain and the second domain; and presenting the one or more suggested courses of action in a graphical user interface.

17 Claims, 15 Drawing Sheets

MACHINE LEARNING-ASSISTED MULTI-DOMAIN PLANNING

BACKGROUND

Battle management includes coordinating activities within an operational/tactical environment, based on commands, direction, and guidance provided by the appropriate authorities. For example, battle management includes establishing courses of action (COAs) based on mission analysis and situational understanding. COAs may be analyzed and vetted based on expected events.

Multi-domain warfare is warfare that spans multiple tactical domains, such as land, sea, air, space, and cyberspace. The complexities of multi-domain warfare with adversaries can overwhelm a decision-maker's ability to rapidly conduct COA-related activities. Multi-domain warfare may thus suffer from unacceptable increases in time and effort required of human operators and analysts. Failure to perform COA-related activities rapidly and effectively may result in loss of assets, including but not limited to buildings, vehicles, supplies, and personnel.

Many non-military objectives also require planning using assets spread across multiple domains and can similarly overwhelm a decision-maker's ability to make timely and effective decisions toward those objectives.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to multi-domain planning, including multi-domain operational/tactical planning.

SUMMARY

In general, in one aspect, one or more non-transitory computer-readable media store instructions that, when executed by one or more processors, cause the one or more processors to perform operations including: receiving first situational data from a first domain and second situational data from a second domain; receiving first user input indicating an objective; applying at least the first situational data, the second situational data, and the objective to a machine learning model, to obtain one or more suggested courses of action for satisfying the objective using assets selected from multiple assets available in the first domain and the second domain; and presenting the one or more suggested courses of action in a graphical user interface.

The operations may further include: during execution of a first course of action in the one or more suggested courses of action, obtaining (a) third situational data from the first domain that is more recent than the first situational data and (b) fourth situational data from the second domain that is more recent than the second situational data; applying at least the third situational data and the fourth situational data to the machine learning model to obtain a suggested adjustment to the first course of action; and presenting the suggested adjustment to the first course of action in the graphical user interface.

The operations may further include: training the machine learning model to generate suggested courses of action that adhere to one or more military doctrines.

Receiving the user input may include: receiving a user selection of a geographical area; responsive to receiving the user selection of the geographical area, presenting multiple available objectives for the geographical area; and receiving a user selection of an objective in the multiple available objectives.

The operations may further include: receiving second user input indicating a change in the first situational data; applying at least the change to the machine learning model to obtain a modified suggested course of action; and presenting the modified suggested course of action in the graphical user interface.

The objective may include physical travel through a contested geographical area, the one or more suggested courses of action including one or more respective routes through the contested geographical area.

The first situational data may include live sensor data from one or more sensors in the first domain, and the second situational data may include live sensor data from one or more sensors in the second domain.

In general, in one aspect, a system includes at least one device including a hardware processor. The system is configured to perform operations including: receiving first situational data from a first domain and second situational data from a second domain; receiving first user input indicating an objective; applying at least the first situational data, the second situational data, and the objective to a machine learning model, to obtain one or more suggested courses of action for satisfying the objective using assets selected from multiple assets available in the first domain and the second domain; and presenting the one or more suggested courses of action in a graphical user interface.

The operations may further include: during execution of a first course of action in the one or more suggested courses of action, obtaining (a) third situational data from the first domain that is more recent than the first situational data and (b) fourth situational data from the second domain that is more recent than the second situational data; applying at least the third situational data and the fourth situational data to the machine learning model to obtain a suggested adjustment to the first course of action; and presenting the suggested adjustment to the first course of action in the graphical user interface.

The operations may further include: training the machine learning model to generate suggested courses of action that adhere to one or more military doctrines.

Receiving the user input may include: receiving a user selection of a geographical area; responsive to receiving the user selection of the geographical area, presenting multiple available objectives for the geographical area; and receiving a user selection of an objective in the multiple available objectives.

The operations may further include: receiving second user input indicating a change in the first situational data; applying at least the change to the machine learning model to obtain a modified suggested course of action; and presenting the modified suggested course of action in the graphical user interface.

The objective may include physical travel through a contested geographical area, the one or more suggested courses of action including one or more respective routes through the contested geographical area.

The first situational data may include live sensor data from one or more sensors in the first domain, and the second situational data may include live sensor data from one or more sensors in the second domain.

In general, in one aspect, a method includes: receiving first situational data from a first domain and second situational data from a second domain; receiving first user input indicating an objective; applying at least the first situational data, the second situational data, and the objective to a machine learning model, to obtain one or more suggested courses of action for satisfying the objective using assets selected from multiple assets available in the first domain and the second domain; and presenting the one or more suggested courses of action in a graphical user interface.

The method may further include: during execution of a first course of action in the one or more suggested courses of action, obtaining (a) third situational data from the first domain that is more recent than the first situational data and (b) fourth situational data from the second domain that is more recent than the second situational data; applying at least the third situational data and the fourth situational data to the machine learning model to obtain a suggested adjustment to the first course of action; and presenting the suggested adjustment to the first course of action in the graphical user interface.

The method may further include: training the machine learning model to generate suggested courses of action that adhere to one or more military doctrines.

Receiving the user input may include: receiving a user selection of a geographical area; responsive to receiving the user selection of the geographical area, presenting multiple available objectives for the geographical area; and receiving a user selection of an objective in the multiple available objectives.

The method may further include: receiving second user input indicating a change in the first situational data; applying at least the change to the machine learning model to obtain a modified suggested course of action; and presenting the modified suggested course of action in the graphical user interface.

The objective may include physical travel through a contested geographical area, the one or more suggested courses of action including one or more respective routes through the contested geographical area.

The first situational data may include live sensor data from one or more sensors in the first domain, and the second situational data may include live sensor data from one or more sensors in the second domain.

In general, in one aspect, one or more non-transitory computer-readable media store instructions that, when executed by one or more processors, cause the one or more processors to perform operations including: receiving first situational data from a first tactical domain and second situational data from a second tactical domain; receiving first user input indicating a tactical objective; applying at least the first situational data, the second situational data, and the tactical objective to a machine learning model, to obtain one or more suggested courses of action for satisfying the tactical objective using assets selected from multiple assets available in the first tactical domain and the second tactical domain; and presenting the one or more suggested courses of action in a graphical user interface.

The operations may further include: during execution of a first course of action in the one or more suggested courses of action, obtaining (a) third situational data from the first tactical domain that is more recent than the first situational data and (b) fourth situational data from the second tactical domain that is more recent than the second situational data; applying at least the third situational data and the fourth situational data to the machine learning model to obtain a suggested adjustment to the first course of action; and presenting the suggested adjustment to the first course of action in the graphical user interface.

The operations may further include training the machine learning model to generate suggested courses of action that adhere to one or more military doctrines.

Receiving the first user input may include: receiving a user selection of a geographical area; responsive to receiving the user selection of the geographical area, presenting multiple available objectives for the geographical area; and receiving a user selection of an objective in the multiple available objectives.

The operations may further include: receiving second user input indicating a hypothetical change in the first situational data; applying at least the hypothetical change to the machine learning model to obtain a hypothetical suggested course of action; and presenting the hypothetical suggested course of action in the graphical user interface.

The tactical objective may include physical travel through a contested geographical area, and the one or more suggested courses of action may include one or more respective routes through the contested geographical area.

The first situational data may include live sensor data from one or more sensors in the first tactical domain, and the second situational data may include live sensor data from one or more sensors in the second tactical domain.

In general, in one aspect, a system includes at least one device including a hardware processor. The system is configured to perform operations including: receiving first situational data from a first tactical domain and second situational data from a second tactical domain; receiving first user input indicating a tactical objective; applying at least the first situational data, the second situational data, and the tactical objective to a machine learning model, to obtain one or more suggested courses of action for satisfying the tactical objective using assets selected from multiple assets available in the first tactical domain and the second tactical domain; and presenting the one or more suggested courses of action in a graphical user interface.

The operations may further include: during execution of a first course of action in the one or more suggested courses of action, obtaining (a) third situational data from the first tactical domain that is more recent than the first situational data and (b) fourth situational data from the second tactical domain that is more recent than the second situational data; applying at least the third situational data and the fourth situational data to the machine learning model to obtain a suggested adjustment to the first course of action; and presenting the suggested adjustment to the first course of action in the graphical user interface.

The operations may further include training the machine learning model to generate suggested courses of action that adhere to one or more military doctrines.

Receiving the first user input may include: receiving a user selection of a geographical area; responsive to receiving the user selection of the geographical area, presenting multiple available objectives for the geographical area; and receiving a user selection of an objective in the multiple available objectives.

The operations may further include: receiving second user input indicating a hypothetical change in the first situational data; applying at least the hypothetical change to the machine learning model to obtain a hypothetical suggested course of action; and presenting the hypothetical suggested course of action in the graphical user interface.

The tactical objective may include physical travel through a contested geographical area, and the one or more suggested courses of action may include one or more respective routes through the contested geographical area.

The first situational data may include live sensor data from one or more sensors in the first tactical domain, and the second situational data may include live sensor data from one or more sensors in the second tactical domain.

In general, in one aspect, a method includes: receiving first situational data from a first tactical domain and second situational data from a second tactical domain; receiving first user input indicating a tactical objective; applying at least the first situational data, the second situational data, and the tactical objective to a machine learning model, to obtain one or more suggested courses of action for satisfying the tactical objective using assets selected from multiple assets available in the first tactical domain and the second tactical domain; and presenting the one or more suggested courses of action in a graphical user interface.

The method may further include: during execution of a first course of action in the one or more suggested courses of action, obtaining (a) third situational data from the first tactical domain that is more recent than the first situational data and (b) fourth situational data from the second tactical domain that is more recent than the second situational data; applying at least the third situational data and the fourth situational data to the machine learning model to obtain a suggested adjustment to the first course of action; and presenting the suggested adjustment to the first course of action in the graphical user interface.

The method may further include training the machine learning model to generate suggested courses of action that adhere to one or more military doctrines.

Receiving the first user input may include: receiving a user selection of a geographical area; responsive to receiving the user selection of the geographical area, presenting multiple available objectives for the geographical area; and receiving a user selection of an objective in the multiple available objectives.

The method may further include: receiving second user input indicating a hypothetical change in the first situational data; applying at least the hypothetical change to the machine learning model to obtain a hypothetical suggested course of action; and presenting the hypothetical suggested course of action in the graphical user interface.

The tactical objective may include physical travel through a contested geographical area, and the one or more suggested courses of action may include one or more respective routes through the contested geographical area.

The first situational data may include live sensor data from one or more sensors in the first tactical domain, and the second situational data may include live sensor data from one or more sensors in the second tactical domain.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

One or more embodiments include techniques and components to augment human decision-making, including COA-related activities, in support of multi-domain warfare. One or more embodiments include a strategic planning system configured to use machine learning, which may present to users as an artificial intelligence (AI) or "smart" assistant, to assist humans with the otherwise overwhelming task of rapid, effective multi-domain tactical decision-making. The strategic planning system uses situational data to generate one or more suggested COAs toward a tactical objective. The strategic planning system may further facilitate workflow tracking. The strategic planning system may be configured to present, in a graphical user interface (GUI), visualizations of a tactical environment, suggested and/or active COAs, assets, etc. The strategic planning system may be capable of prioritizing and scaling to a large number of entities and/or assets (e.g., on the order of thousands). The visualizations presented in the GUI may include, for example, visualizations of routes automatically generated by the strategic planning system and optimized according to user-defined route goals. The strategic planning system may be configured to track commanders' intent objectives and update suggested COAs dynamically, as the situation in the tactical environment develops. In its recommendations, the strategic planning system may be configured to enforce military doctrines. These and other features, according to one or more embodiments, are discussed in further detail below.

I. SYSTEM ARCHITECTURE

Figure 1:
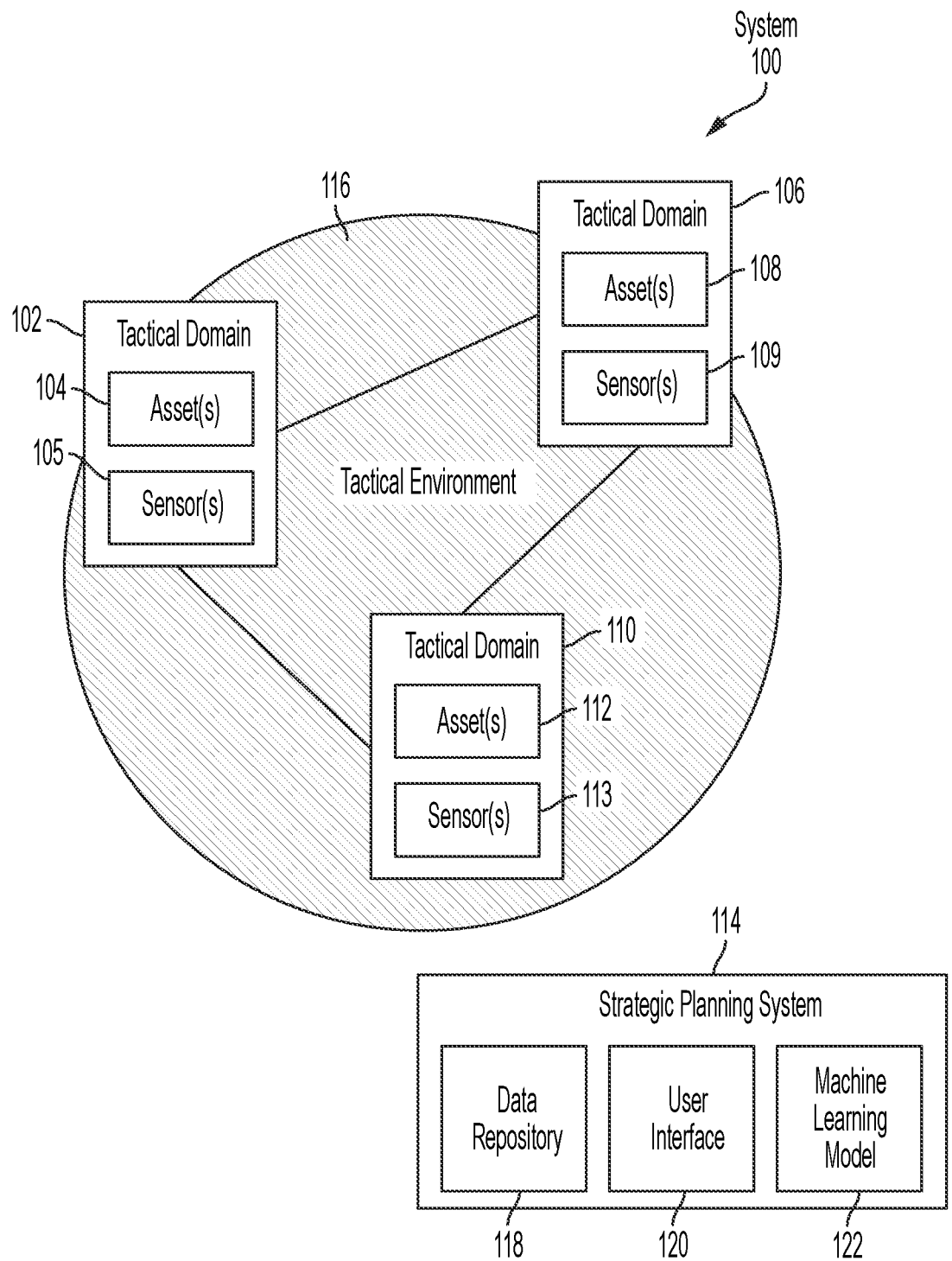
FIG. 1 is a block diagram of an example of a system according to an embodiment.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The system 100 illustrated in FIG. 1 is a multi-domain system. Specifically, in this example, a tactical environment 116 includes three tactical domains 102, 106, 110. The tactical domains 102, 106, 110 may include, for example, one or more of land, sea, air, space, and cyberspace. One or more tactical domains 102, 106, 110 may further be defined by a geographic area (e.g., a particular country, a range from a fixed or moving point, etc.) and/or a region of cyberspace. A tactical environment 116 is a physical and/or virtual environment in which a particular tactical objective is to be pursued. For example, a tactical environment 116 may refer to one or more battlefields, one or more areas of cyberspace, and/or another kind of tactical environment or combination thereof. In the example illustrated in FIG. 1, at least one asset in each of the tactical domains 102, 106, 110 is physically and/or logically located within the tactical environment 116.

Each tactical domain 102, 106, 110 includes respective assets 104, 108, 112, some or all of which may be available to deploy toward a tactical objective. As used herein, an "asset" may refer to a manned or unmanned vehicle (e.g., truck, airplane, helicopter, drone, boat, submarine, etc.), one or more human personnel, one or more weapons, one or more compute resources, and/or another kind of asset or combination thereof. For example, tactical domain 102 may be an aeronautical domain that includes aeronautical assets such as airplanes, helicopters, drones, etc.

One or more of the tactical domains 102, 106, 110 may include one or more respective sensor(s) 105, 109, 113 configured to obtain situational data and transmit the situational data to a strategic planning system 114. For example, one or more of the sensors 105, 109, 113 may include one or more photography and/or video devices, global positioning systems (GPS), light detection and ranging (LiDAR), etc.

In an embodiment, a strategic planning system 114 refers to hardware and/or software configured to perform operations described herein for machine learning-assisted multi-domain tactical planning according to an embodiment. Specifically, the strategic planning system 114 is configured to perform operations described herein for using a machine learning model 122 to augment human capabilities in multi-domain tactical planning. The strategic planning system 114 may include a machine learning engine (not shown) configured to train the machine learning model 122, using supervised and/or unsupervised learning. Alternatively or additionally, the strategic planning system 114 may be configured to use a pre-trained machine learning model 122. Examples of operations for machine learning-assisted multi-domain tactical planning are described below.

In an embodiment, the machine learning model 122 is trained to implement one or more digitized military doctrines (e.g., Joint Publication (JP) 5-0, Military Decision-Making Process (MDMP), and/or another military doctrine or combination thereof). Implementing a military doctrine may help, for example, with military and other training. For example, techniques described herein may be applied to training in a wargaming environment, where both the "friendly" and "enemy" forces use the strategic planning system 114 to strategically plan their missions. The simulated forces may then execute their missions according to their respective plans. Based on the outcomes of the missions, the strategic planning system 114 may apply reinforcement learning to improve the machine learning model 122. Alternatively or additionally, a supervisory function (not shown) may be configured to change the rules of engagement during execution of a wargame, requiring that the original plan(s) change in order to win the "battle" (game). Reinforcement learning may then be based on how well each force uses unsupervised learning to respond to the unplanned changes introduced by the supervisory function.

Alternatively or additionally, implementing one or more digitized military doctrines may help ensure that users adhere to those doctrines when establishing COAs, particularly if a user is relatively novice to the tactical environment. The strategic planning system 114 may include information about which relevant doctrine(s) or portion(s) thereof have been applied, which may help with on-the-job user training on the doctrine(s).

The strategic planning system 114 may include a data repository 118. A data repository 118 may be any type of storage unit and/or device (e.g., a file system, database, collection of tables, or any other storage mechanism) for storing data. A data repository 118 may include multiple different storage units and/or devices. The multiple different storage units and/or devices may or may not be of the same type or located at the same physical site. Further, a data repository 118 may be implemented or may execute on the same computing system as one or more other components of the system 100. Alternatively or additionally, a data repository 118 may be implemented or executed on a computing system separate from one or more other components of the system 100. A data repository 118 may be logically integrated with one or more other components of the system 100. Alternatively or additionally, a data repository 118 may be communicatively coupled to one or more other components of the system 100 via a direct connection or via a network.

The strategic planning system 114 may include a user interface 120. A user interface 120 refers to hardware and/or software configured to facilitate communications between a user and a strategic planning system 114. Specifically, the user interface 120 is configured to facilitate interactions between one or more users and machine learning-supported strategic planning features described herein. Some examples of a user interface 120 according to an embodiment are discussed in further detail below.

In general, a user interface 120 renders user interface 120 elements and receives input via user interface 120 elements. A user interface 120 may be a graphical user interface 120 (GUI), a command line interface (CLI), a haptic interface, a voice command interface, and/or any other kind of interface or combination thereof. Examples of user interface 120 elements include checkboxes, radio buttons, dropdown lists, list boxes, buttons, toggles, text fields, date and time selectors, command lines, sliders, pages, and forms. Different components of a user interface 120 may be specified in different languages. The behavior of user interface 120 elements may be specified in a dynamic programming language, such as JavaScript. The content of user interface 120 elements may be specified in a markup language, such as hypertext markup language (HTML), Extensible Markup Language (XML), or XML User interface 120 Language (XUL). The layout of user interface 120 elements may be specified in a style sheet language, such as Cascading Style Sheets (CSS). Alternatively or additionally, aspects of a user interface 120 may be specified in one or more other languages, such as Java, Python, Perl, C, C++, and/or any other language or combination thereof.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

II. MACHINE LEARNING

In embodiment, a machine learning engine trains a machine learning model (e.g., as shown in FIG. 1) to perform one or more operations, e.g., identifying and/or evaluating COAs, creating mission plans, generating suggested routes, etc. Training a machine learning model uses training data to generate a function that, given one or more inputs to the machine learning model, computes a corresponding output. The output may correspond to a prediction based on prior machine learning. In an embodiment, the output includes a label, classification, and/or categorization assigned to the provided input(s). The machine learning model corresponds to a learned model for performing the desired operation(s) (e.g., labeling, classifying, and/or categorizing inputs). A system may use multiple machine learning engines and/or multiple machine learning models for different purposes.

A machine learning engine may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. For example, training data may include parameters and outcomes of different COAs. Training data may include data generated during military exercises where two real forces (e.g., real troops, real tanks, and/or other real assets) oppose each other, in a manner similar to a simulated wargame. Training data obtained from military exercises may include, for example: troop and asset movement (e.g., whether they hold formation, bunch up, disperse, etc.); numbers of shots fired; number of "casualties"; percentage of personnel "killed"; equipment performance (e.g., of a tank or gun) relative to the equipment's specifications (e.g., range, accuracy, etc.); and/or other kinds of data gathered during the exercises. Similarly, training data may be obtained from other kinds of exercises and/or from actual battles (i.e., actual adversarial engagements).

In semi-supervised learning, some inputs are associated with supervisory signals and other inputs are not associated with supervisory signals. In unsupervised learning, the training data does not include supervisory signals. Reinforcement learning uses a feedback system in which the machine learning engine receives positive and/or negative reinforcement in the process of attempting to solve a particular problem (e.g., to optimize performance in a particular scenario, according to one or more predefined performance criteria). In an embodiment, the machine learning engine initially uses supervised learning to train the machine learning model and then uses unsupervised learning to update the machine learning model on an ongoing basis.

A machine learning engine may use many different techniques to label, classify, and/or categorize inputs. A machine learning engine may transform inputs into feature vectors that describe one or more properties ("features") of the inputs. The machine learning engine may label, classify, and/or categorize the inputs based on the feature vectors. Alternatively or additionally, a machine learning engine may use clustering (also referred to as cluster analysis) to identify commonalities in the inputs. The machine learning engine may group (i.e., cluster) the inputs based on those commonalities. The machine learning engine may use hierarchical clustering, k-means clustering, and/or another clustering method or combination thereof. In an embodiment, a machine learning engine includes an artificial neural network. An artificial neural network includes multiple nodes (also referred to as artificial neurons) and edges between nodes. Edges may be associated with corresponding weights that represent the strengths of connections between nodes, which the machine learning engine adjusts as machine learning proceeds. Alternatively or additionally, a machine learning engine may include a support vector machine. A support vector machine represents inputs as vectors. The machine learning engine may label, classify, and/or categorizes inputs based on the vectors. Alternatively or additionally, the machine learning engine may use a naïve Bayes classifier to label, classify, and/or categorize inputs. Alternatively or additionally, given a particular input, a machine learning model may apply a decision tree to predict an output for the given input. Alternatively or additionally, a machine learning engine may apply fuzzy logic in situations where labeling, classifying, and/or categorizing an input among a fixed set of mutually exclusive options is impossible or impractical. The aforementioned machine learning model and techniques are discussed for exemplary purposes only and should not be construed as limiting one or more embodiments.

III. EXAMPLE OPERATIONS FOR MACHINE LEARNING-ASSISTED MULTI-DOMAIN TACTICAL PLANNING

In general, machine learning-assisted multi-domain tactical planning may include one or more of: (1) determining and tracking a commander's intent objectives; (2) executing mission objectives (which may include monitoring and sending updates to the commander); (3) implementing a digitized military doctrine for both a friendly force (Blue Force) and an opposing force (Red Force) (e.g., Joint Publication (JP) 5-0, Military Decision-Making Process (MDMP), and/or another military doctrine or combination thereof); (4) autonomously reporting status and results (e.g., COA analysis); (5) providing a comparison and requesting decisions (e.g., a COA comparison including performance thresholds, strengths and weaknesses, advantages and disadvantages, etc.); and/or (6) inquiring as to other tasks that may be desired (e.g., by generating and/or updating COAs based on changing battle conditions). Some of all of these steps may form a workflow loop, thus providing an ongoing, evolving tactical planning process.

Figure 2A:
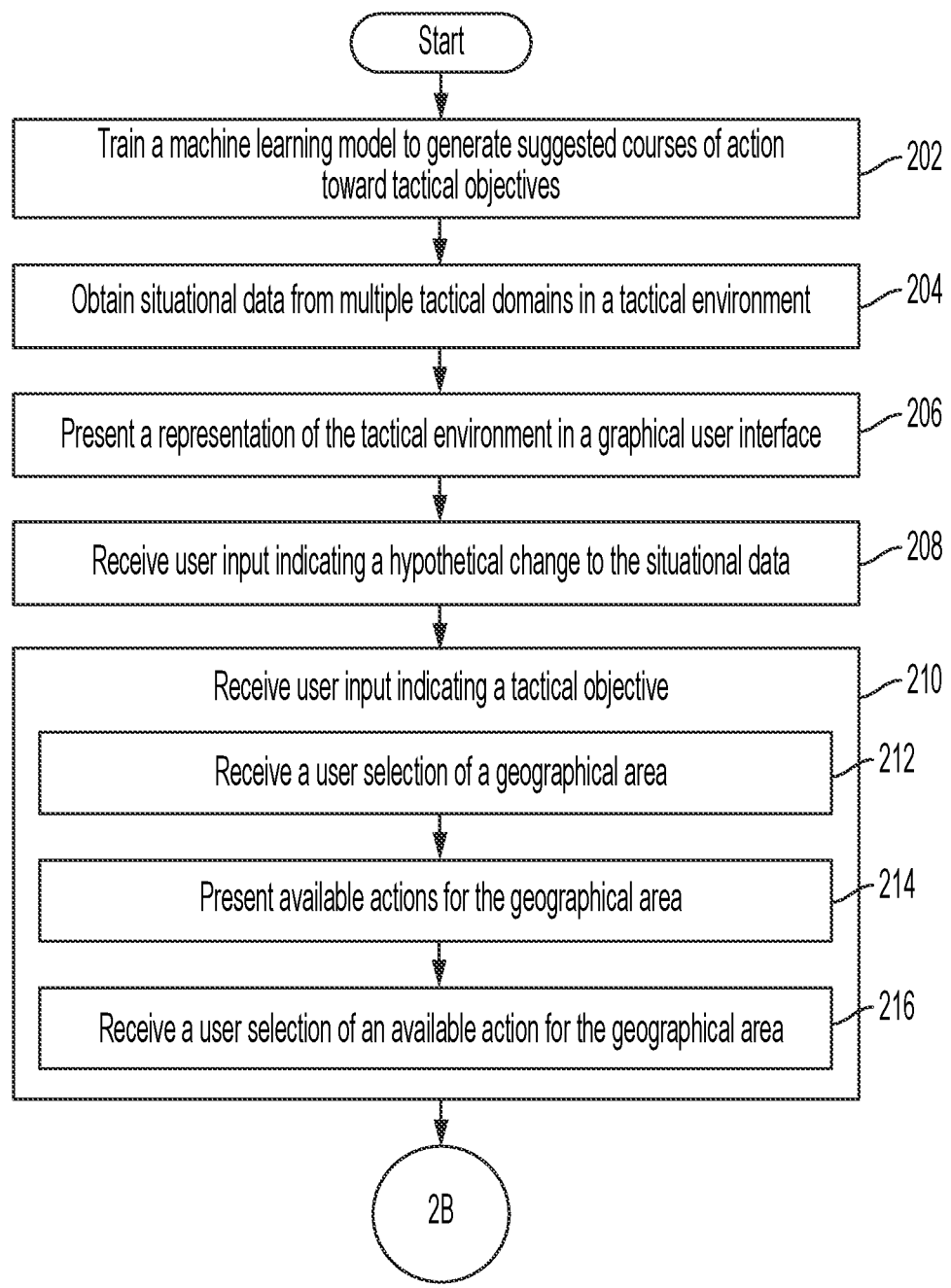
FIGS. 2A-2B are a flow diagram of an example of operations for machine learning-assisted multi-domain planning according to an embodiment.
Figure 2B:
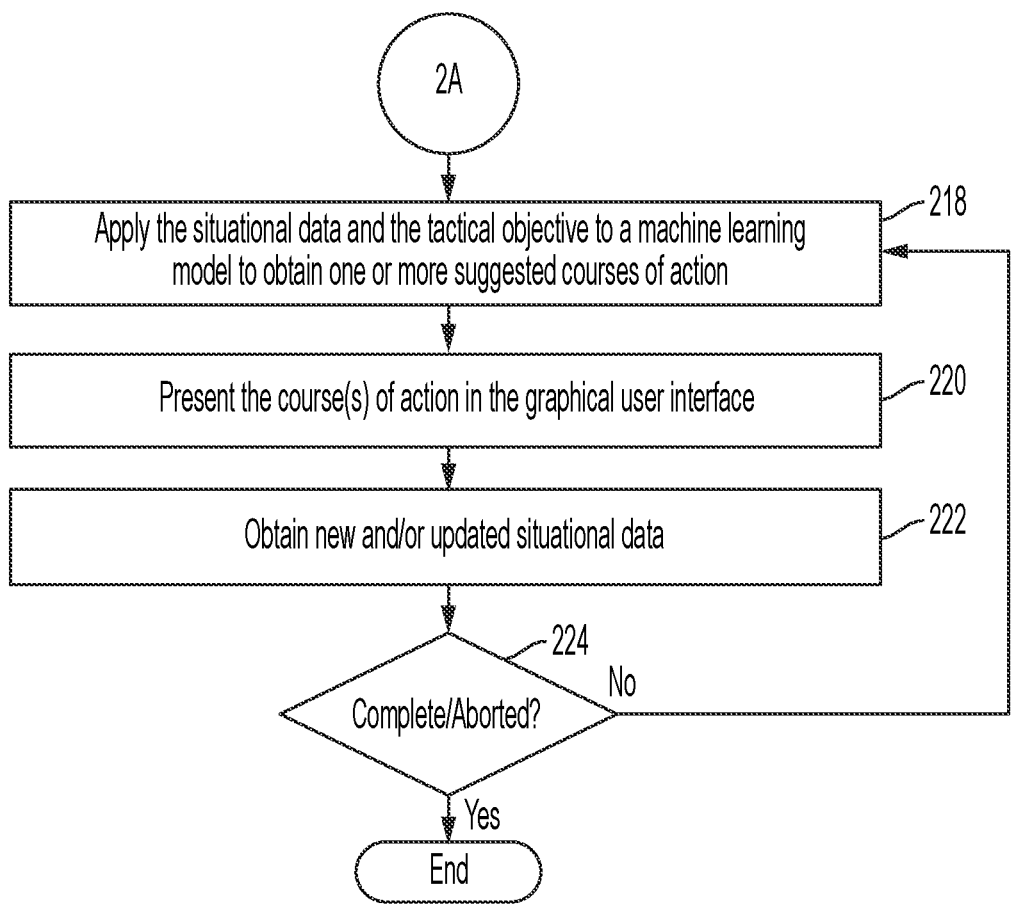

FIGS. 2A-2B are a flow diagram of an example of operations for machine learning-assisted multi-domain planning according to an embodiment. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

In the following discussion, examples are provided in the context of multi-domain tactical planning. As discussed in further detail herein, similar operations may be applied to multi-domain planning in non-military contexts.

In an embodiment, a strategic planning system trains a machine learning model to generate suggested COAs toward tactical objectives (Operation 202). Some examples of machine learning techniques are described above.

When deployed, the strategic planning system may obtain situational data from multiple tactical domains in a tactical environment (Operation 204). The strategic planning system may obtain the situational data from one or more sensors in one or more of the tactical domains, from one or more application programming interfaces (APIs) of other systems or subsystems configured to obtain situational data, and/or via manual user input.

The strategic planning system may present a representation of the tactical environment in a graphical user interface (GUI) (Operation 206). For example, the representation of the tactical environment may include a map of a geographical environment (including some or all of the tactical environment), a model of an area of cyberspace included in the tactical environment, etc. The representation may include information about the situational data, such as kinds and numbers of assets available, locations of key features (e.g., bases, targets, landmarks, etc.), and/or other kinds of information relating to the tactical environment.

The strategic planning system may receive user input indicating a hypothetical change to the situational data (Operation 208). The hypothetical change may correspond to a "what if" scenario, e.g., what if this asset were in a different location, what if we deployed an additional asset, what if weather conditions change, etc.

The strategic planning system may receive user input indicating a tactical objective (Operation 210). In an embodiment, receiving user input indicating a tactical objective may include receiving a user selection of a geographical area (Operation 212). For example, a user may use a touchscreen, mouse, and/or other kind of input device to "draw" a shape on the map to define an area of interest (AOI). The strategic planning system may present available objectives (also referred to herein as "activities") for the selected geographical area (Operation 214). The strategic planning system may receive a user selection of an objective, from the available objectives for the geographical area (Operation 216). The objective may include one or more configurable features (e.g., priority, important route goals, etc.), which the strategic planning system may factor into its computations.

The strategic planning system may apply the situational data and the tactical objective to a machine learning model (e.g., a model trained as described above), to obtain one or more suggested COAs (Operation 218). The suggestion(s) may include, for example, one or more recommended assets to deploy toward the objective, a recommended route, etc. The strategic planning system may present the suggested COA(s) in the GUI (Operation 220), so that a user can select a COA to apply, optionally with one or more hypothetical changes.

In an embodiment, the strategic planning system continues to obtain and analyze situational data. Changes in the tactical environment may necessitate changes to an active COA. As with the original situational data used to generate the COA, the strategic planning system may obtain new and/or updated situational data from one or more sensors in one or more of the tactical domains, from one or more APIs of other systems or subsystems configured to obtain situational data, and/or via manual user input. Alternatively or additionally, when a COA is completed, another COA may be needed. The strategic planning system may obtain new and/or updated situational data (Operation 222) and use it in a feedback loop to generate a suggested adjustment to a current COA (or suggest a new COA) (Operation 218). The strategic planning system may be configured to execute the feedback loop to generate revised and/or new suggested COAs on an ongoing basis, as needed, until a tactical objective is complete or the mission is otherwise aborted (Operation 224).

As one example of the aforementioned feedback loop, the strategic planning system may generate an initial COA for a group of Blue Force assets against an invading group of Red Force assets. After generating the COA, the strategic planning system may obtain sensor data indicating that a Red Force reinforcement from a nearby airbase is preparing to attack. Responsive to receiving the new sensor data, the strategic planning system may augment the original COA to include a new Red Force area of interest (AOI) with additional Blue Force assets (i.e., assets not previously assigned in the original COA) assigned to defeat the Red Force reinforcement. In this example, the COA may only be augmented; the original suggestion(s) may remain unmodified. Alternatively, the introduction of the Red Force reinforcement may necessitate an adjustment to one or more aspects of the original COA.

In an embodiment, as the strategic planning system operates on an ongoing basis, it is configured to continue to update the machine learning model using unsupervised learning. Specifically, in addition to providing revised and/or new suggestions, the strategic planning system may continue to learn from the outcomes of executing its own suggestions (with or without user-provided modifications). The suggestions made by the strategic planning system may thus continue to evolve and improve over time.

IV. NON-MILITARY MULTI-DOMAIN PLANNING

As noted above, the discussion of FIGS. 2A-2B includes examples in the context of multi-domain tactical planning. An example of similar operations applied to multi-domain planning in non-military contexts is provided below. This example is provided for illustrative purposes only. Techniques and components described herein may be applied to many other kinds of non-military objectives.

In this example, operations described herein may provide a personal "Course of Action (COA) Adventure" or "COA Travel Assistant." The strategic planning system (referred to in this example simply as the "system") may provide a unique user experience from the start of a traveler's adventure to its finish, helping the traveler plan their personal course of action for a given adventure scenario. From the development of the adventure, to analyzing which courses of action best satisfy the traveler's adventure objectives, to comparing adventure alternatives, the system may provide all that is required to plan a traveler's subjectively "perfect" adventure, and then monitor and execute the optimum adventure in real-time.

As an example of adventure execution, the system may be configured to provide notifications to a smartwatch or other mobile device. After a traveler sets up few personalized settings, they can allow the system to guide them on their adventure. The system may start a personalized COA with a traffic report, to let the traveler know when they should leave to get to the airport. If the traveler has a "smart" car, the system may notify them of the feasibility of successfully executing the adventure, such as letting them know if the car is running low on gas. In addition, the system may provide machine learning-assisted route planning, such as adding a waypoint to fill up at a gas station and then updating the estimated departure time to make up the difference. The system may alert the traveler with flight tracking updates, so that their personal COA can be dynamically adjusted, including information updates for gate changes and/or other kinds of airline issues. Trying to navigate an airport can be frustrating, but the system may be configured to reference the airport map and continually update the traveler's personal COA with recommendations for food places near their gate, the locations of the traveler's favorites places to eat (this data may be learned over time using, for example, machine learning and global positioning system (GPS) tracking), and the locations of restrooms if the need arises.

Once the traveler lands at their destination, they may have custom notifications configured so that the system sends a text update to loved ones back home, letting them know the flight landed safely. If a hotel is already booked, the system may help the traveler reach the hotel with GPS directions. Alternatively or additionally, the system may offer up a variety of COA alternatives at any phase of the adventure, such as identifying available hotels near popular tourist attractions near the traveler's current location. Based on the traveler's predetermined adventure objectives entered before the trip, the system may dynamically offer suggested attractions, which may include attractions the traveler had not already considered and/or that were not available when the trip was initially planned. As the adventure continues, the system may continually update the traveler's COA adventure, for example, by suggesting when to take photos and allowing the traveler to save them to a trip folder. After the traveler's travels have completed, the system may provide a trip assessment including a slide show of their photos and other acquired multi-source information, which the traveler may then share with friends and family. A similar process may be similarly applied to the return trip.

V. DETAILED EXAMPLE

A detailed example is described below for purposes of clarity. Specifically, FIGS. 3A-3K illustrate an example of machine learning-assisted multi-domain tactical planning according to an embodiment. Components and/or operations described below should be understood as examples that may not be applicable to one or more embodiments. Accordingly, components and/or operations described below should not be construed as limiting the scope of one or more embodiments.

Figure 3A:
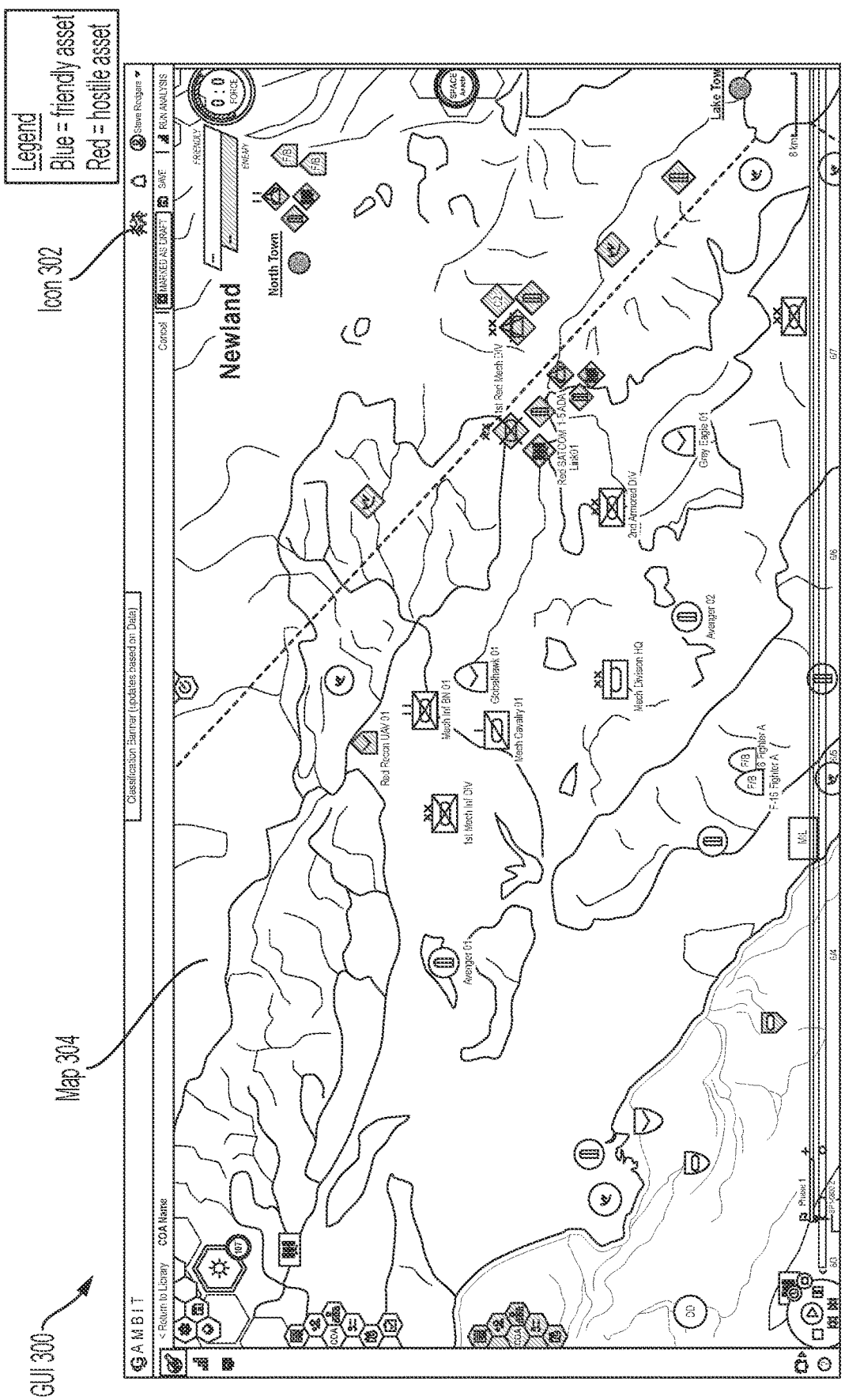
FIGS. 3A-3K illustrate an example of machine learning-assisted multi-domain tactical planning according to an embodiment.

FIG. 3A illustrates an example of a GUI 300 according to an embodiment. On this screen, the GUI 300 includes a map 304 of some or all of a tactical environment, which in this example spans land, sea, and air. Situational data displayed on the map 304 includes the locations of friendly (Blue Force) and hostile (Red Force) assets (e.g., vehicles, satellite links, etc.). A user may interact with the GUI (e.g., by "drawing" a shape on the screen) to select an area of interest (AOI) on the map 304. In addition, an icon 302 provides convenient access to various features of the strategic planning system. In this example, the strategic planning system presents to the user as a "smart assistant" called GAMBIT Artificial Intelligence Assistant, or "GAIA" for short.

Figure 3B:
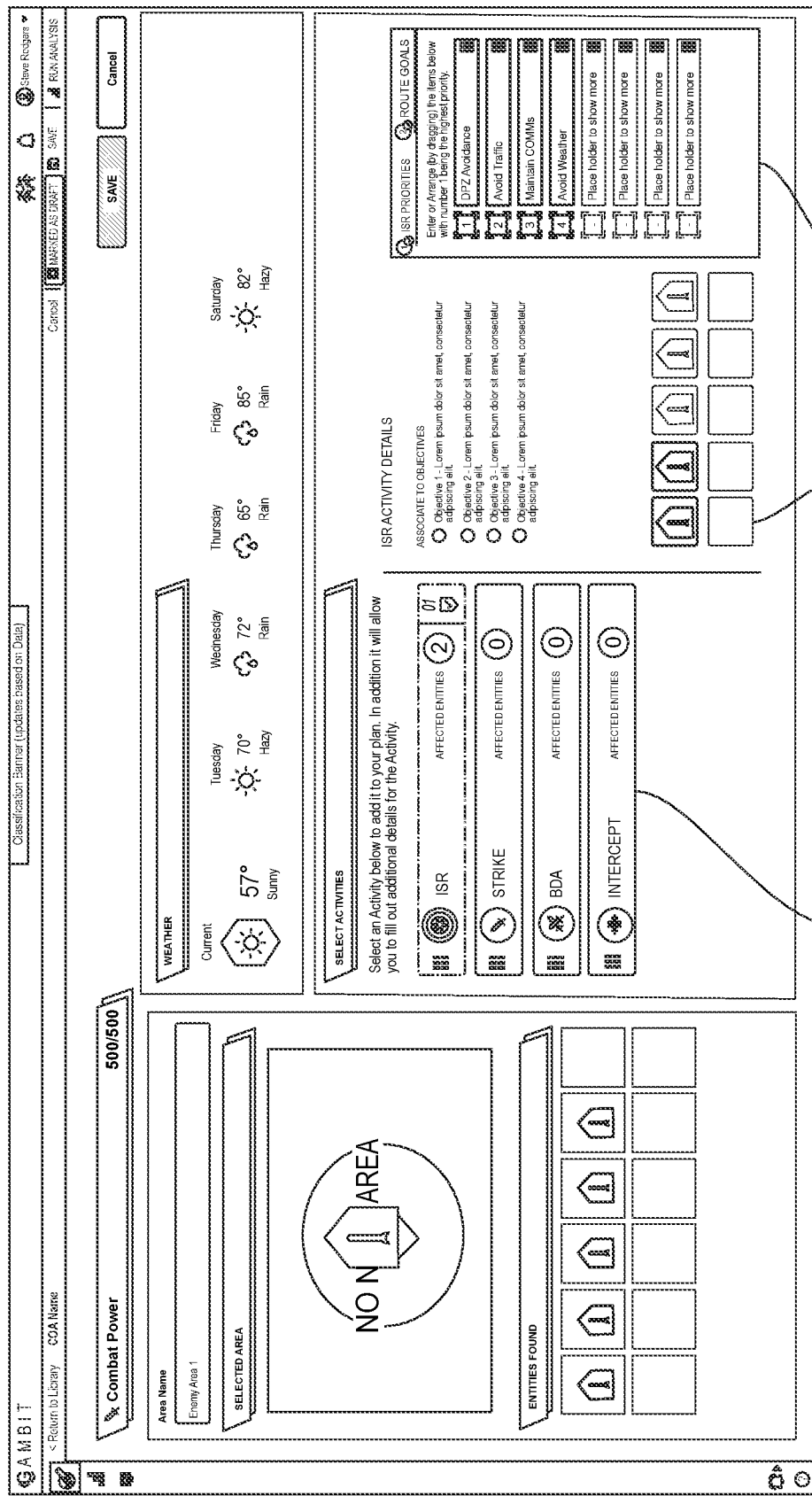

FIG. 3B illustrates an example of a screen that may appear in the GUI 300 when a user selects an area of interest (AOI). Here, a user may select from multiple activities 306 available to perform in that AOI. The available activities may depend on features of the AOI. In addition, an activity may be associated with activity details 308. In this example, the intelligence, surveillance, reconnaissance (ISR) activity is selected and corresponding activity details 308 are shown. For a selected activity 306, a user may select from pre-defined priorities for the activity, and/or route goals that are considered important. The strategic planning system may include user-specified priorities and/or route goals 310 when generating a suggested route.

Figure 3C:
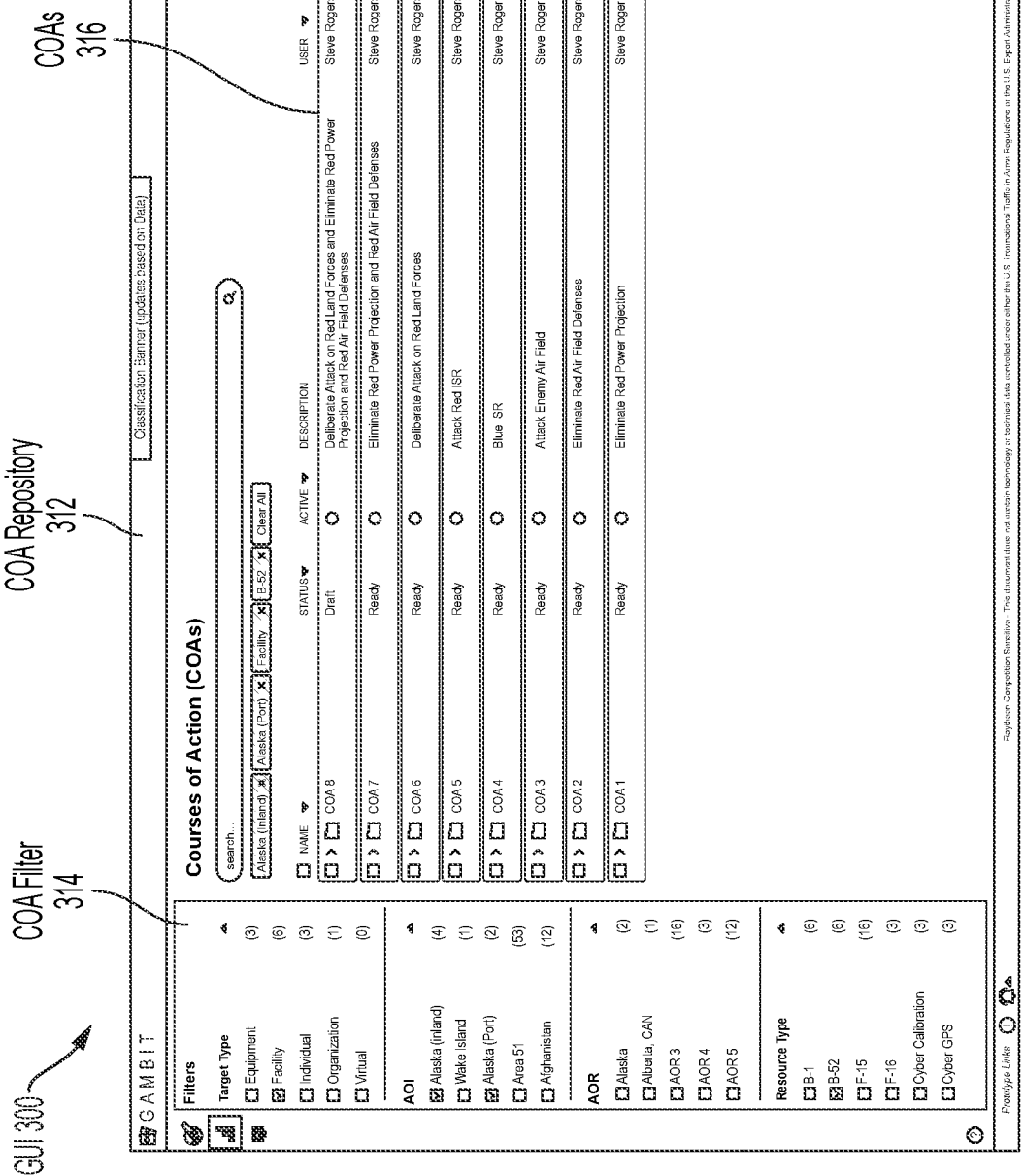

FIG. 3C illustrates an example of a COA repository 312 that may be displayed in the GUI 300. Using the COA repository 312, a user (e.g., a commander) may manually select an existing COA 316 that supports the user's intent objectives. The user may apply one or more COA filters 314 to narrow the COAs 316 displayed in the GUI 300 by target type, AOI, area of responsibility (AOR), resource type, etc. Alternatively or additionally, a user may instruct the strategic planning system to use automated techniques such as reinforcement learning (RL) to autonomously select a COA 316 that supports the user's intent objectives. Specifically, the strategic planning system may apply RL, based on past history, to select the COA 316 that most closely satisfies the user's intent criteria. If none of the available COAs 316 adequately satisfy the user's intent criteria (e.g., based on a predetermined threshold likelihood of success, and/or another threshold metric), the strategic planning system may execute an automated process to generate a new COA 316 that does satisfy the user's intent criteria. The strategic planning system may then add the newly generated COA 316 to the COA repository 312 to be considered for application toward future tactical objectives.

Figure 3D:
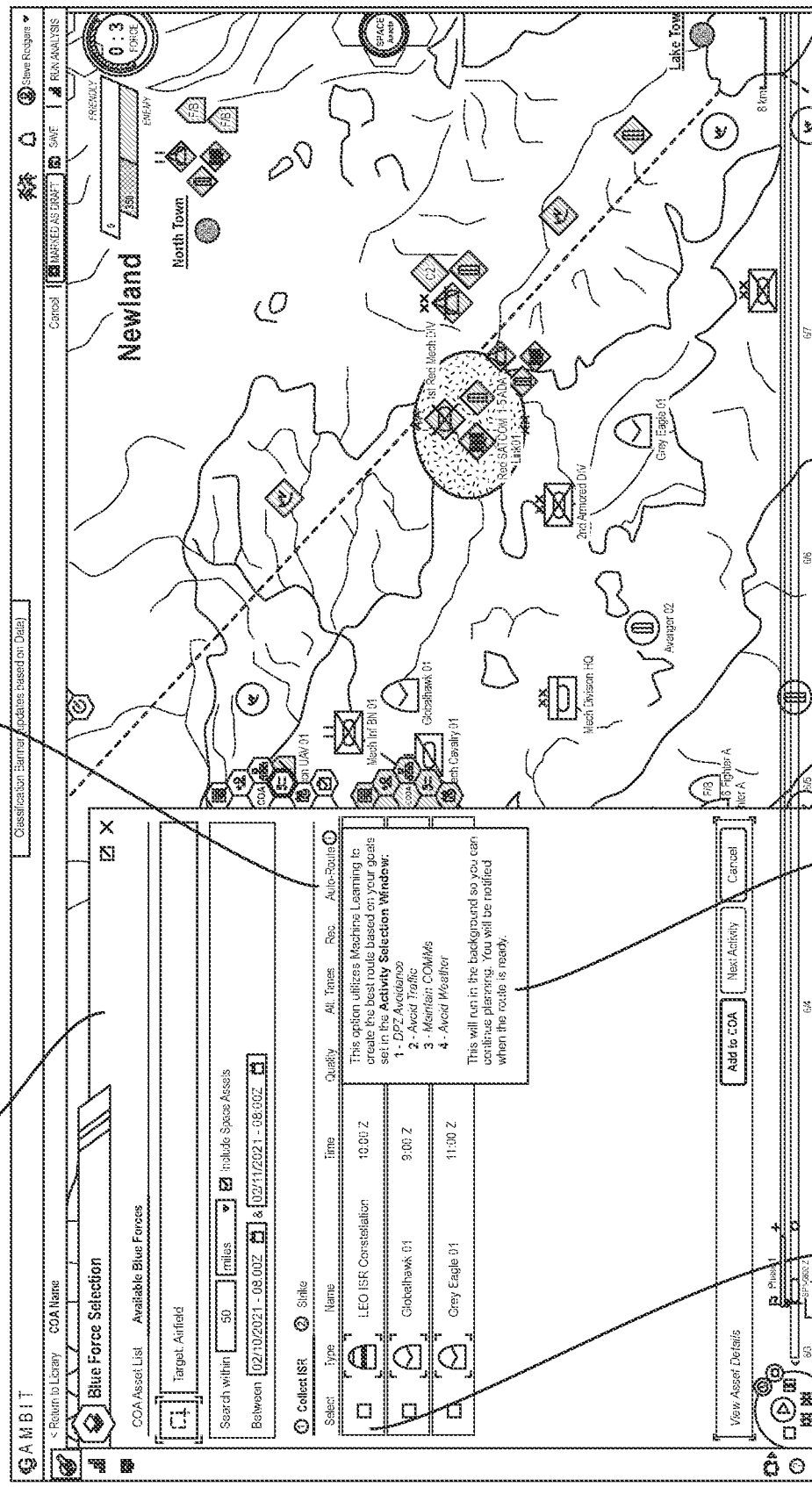
Figure 3E:
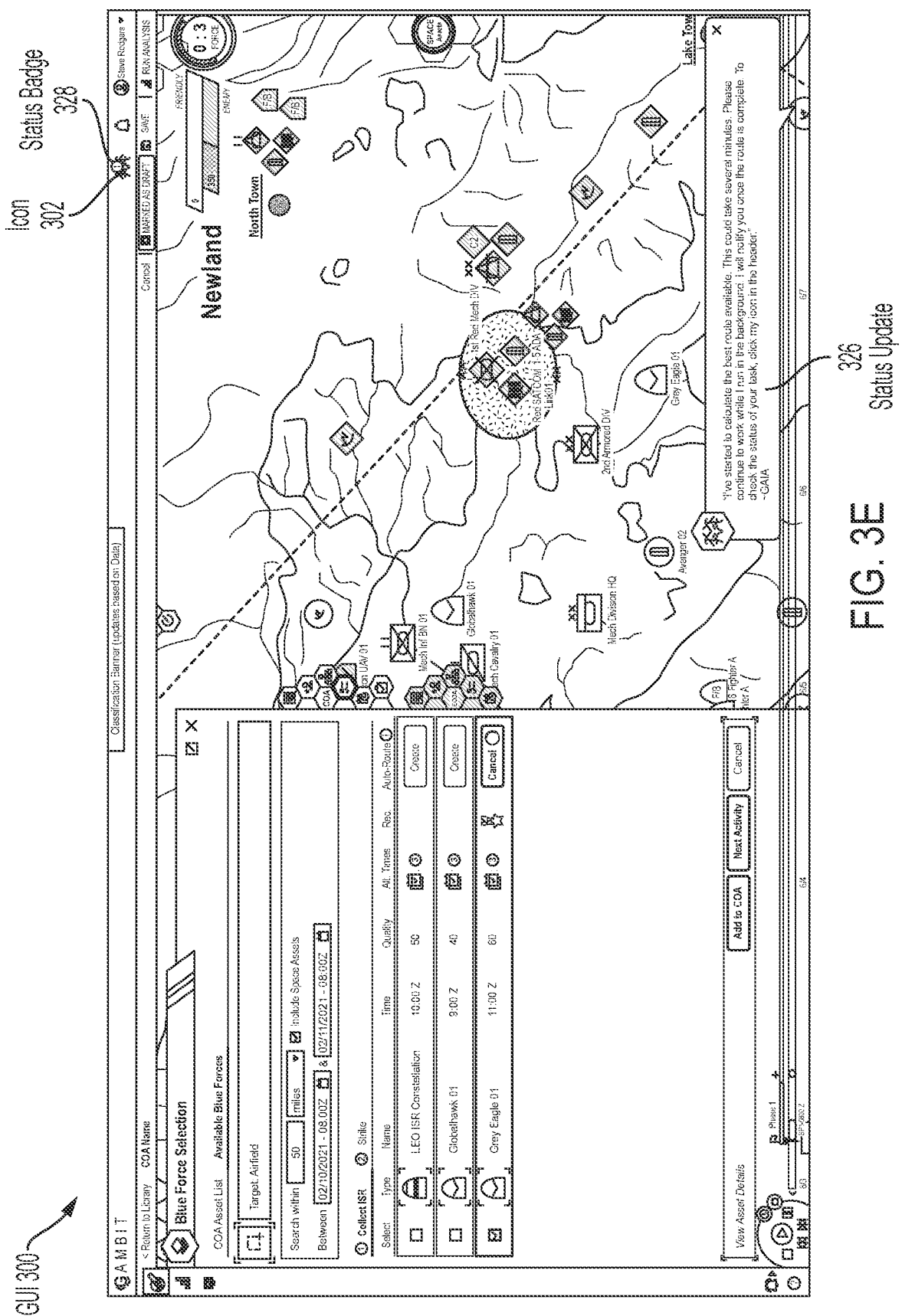
Figure 3F:
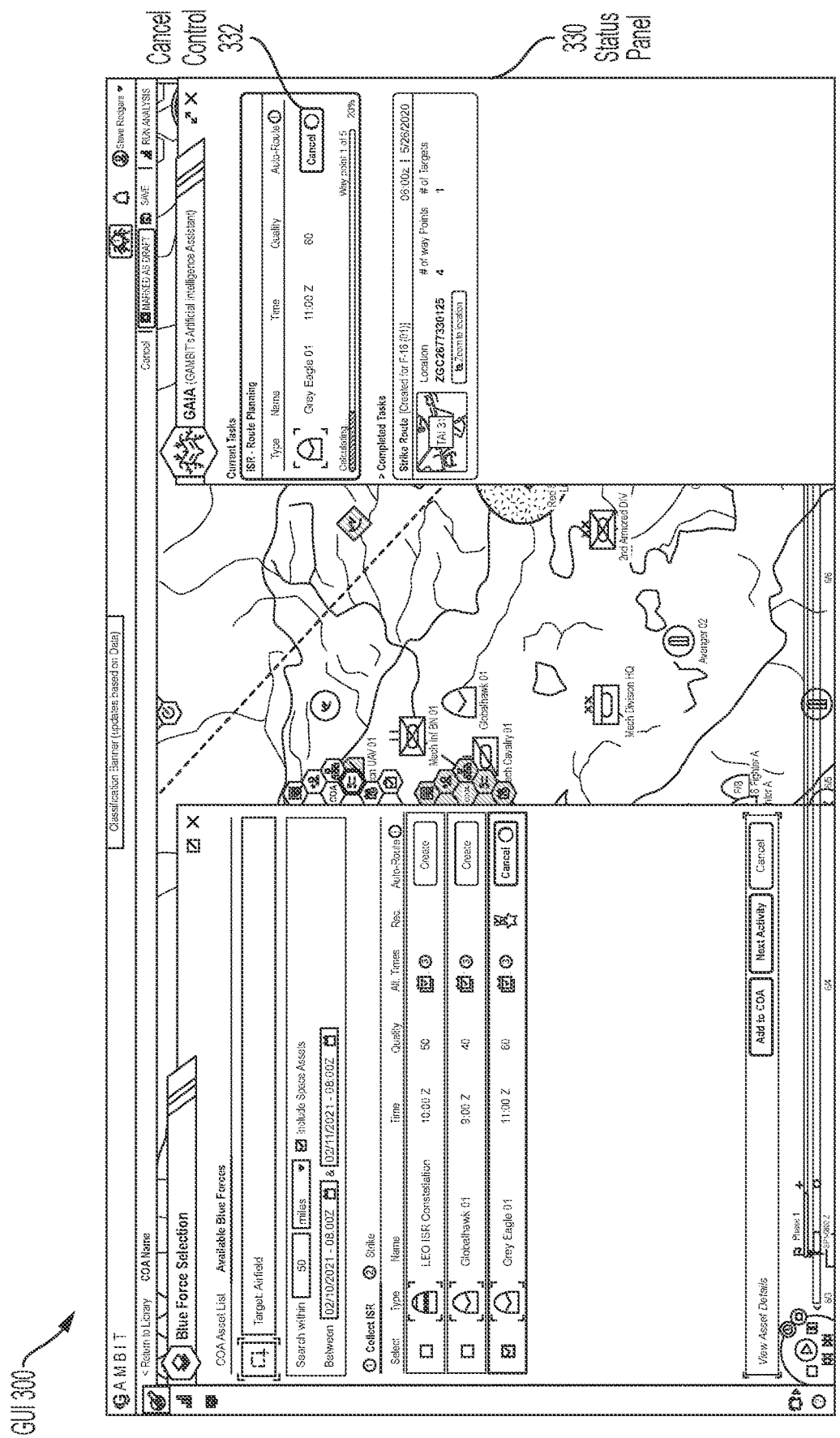

Referring now to FIG. 3D, after a user has selected an AOI, an asset selection panel 318 may be displayed in the GUI 300. The asset selection panel 318 includes information about assets 320 that are available to deploy toward a tactical objective in the selected AOI. The user may select from among the available assets 320 to perform a previously selected activity. In this example, the strategic planning system uses the ISR priorities provided by the user to generate a recommendation as to which asset(s) 320 would achieve the best results. In addition, the user may select an auto-routing option 322, to instruct the strategic planning system to use machine learning to generate a suggested route. The suggested route may be optimized for one or more user-selected goals, such as avoiding certain areas or features, maintaining communications (COMMs), avoiding inclement weather, etc. In FIG. 3D, a help window 324 provides the user with information about the auto-routing option As shown in FIG. 3E, responsive to a user instruction to generate an auto-route, the strategic planning system may present a status update 326, informing the user that machine learning is working on computing a recommended route based on the user's specified route goals. The status update 326 further informs the user that the strategic planning system will alert the user when the auto-route is available. The user may continue to work and plan out other activities, using the GUI 300, while the strategic planning system is processing the route request. A status badge 328 may be applied to the icon 302, indicating how many requests the strategic planning system is currently processing. The user may select the icon 302 to view additional information about what requests the strategic planning system is processing and/or has completed. For example, as illustrated in FIG. 3F, when the user selects the icon 302, a status panel 330 may display in the GUI 300. The status panel 330 may include an overview of ongoing and/or completed tasks, including task statuses, a cancel control 332 for canceling an ongoing task, etc.

Figure 3G:
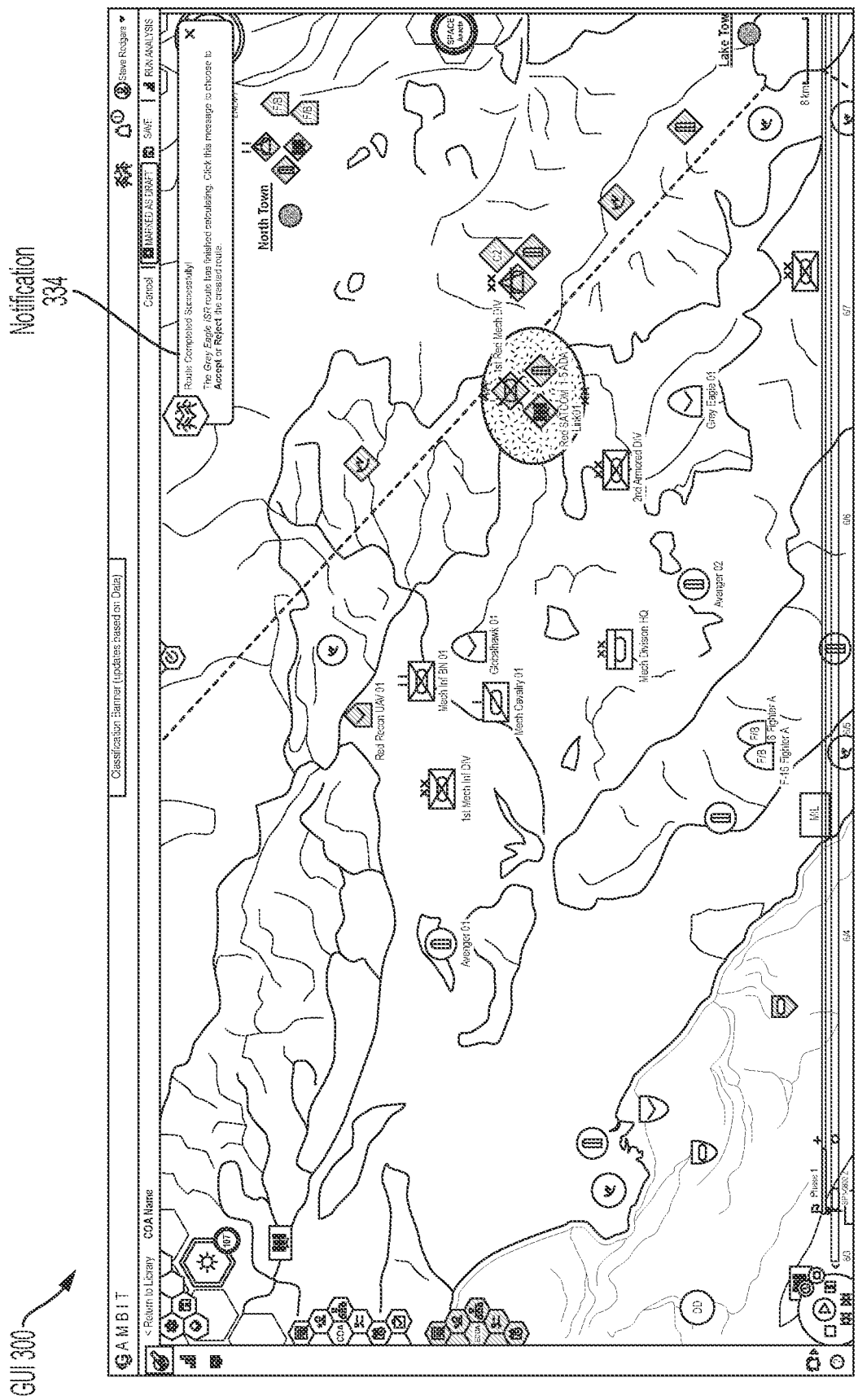
Figure 3H:
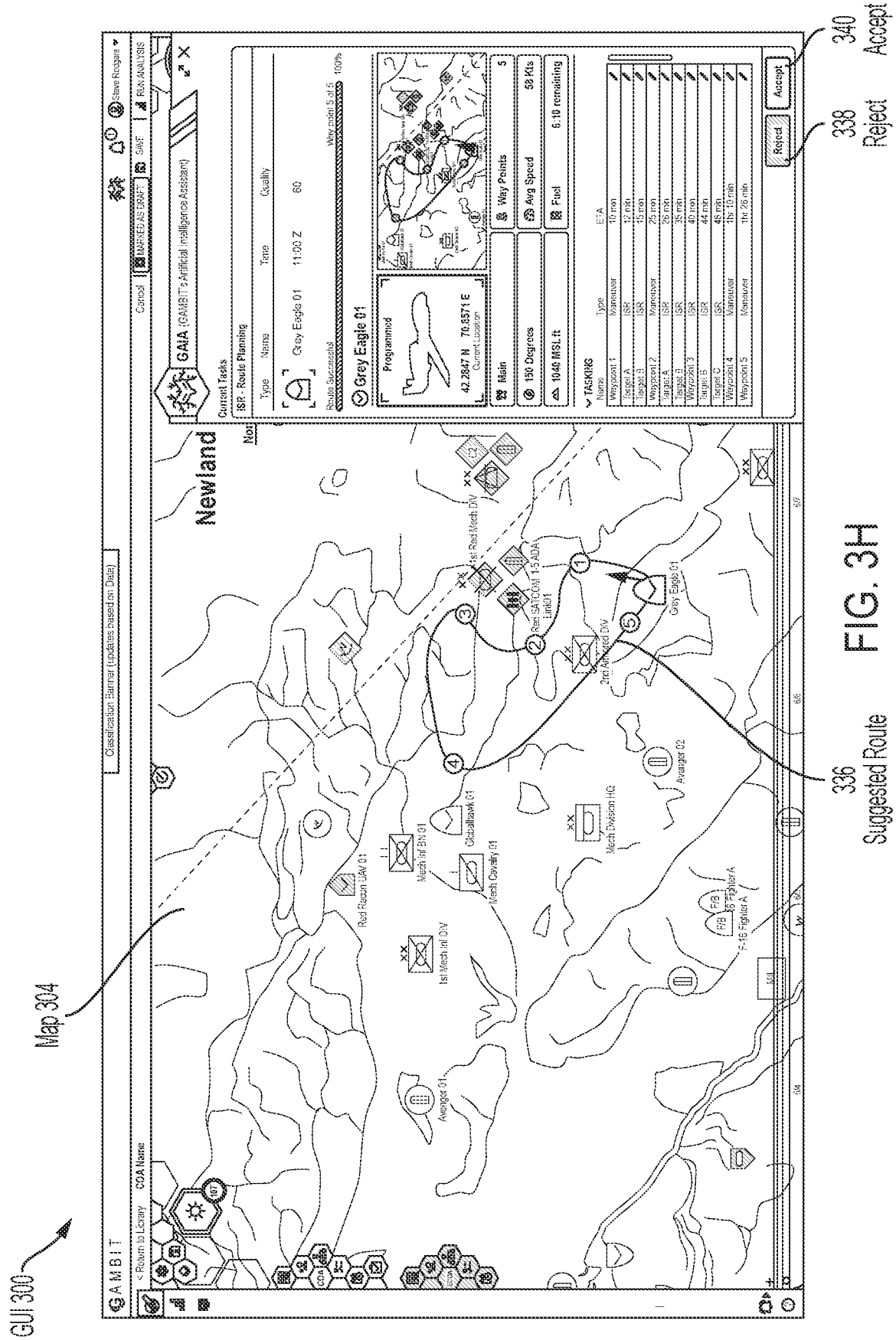

Referring now to FIG. 3G, when a task is completed, the strategic planning system may generate a notification 334. The notification 334 may indicate that processing is complete and that user action is required. For example, a user may interact with the message to display the suggested route 336 overlaid on the map 304 as shown in FIG. 3H. From here, the user may choose to reject 338 or accept 340 the suggested route 336.

Figure 3I:
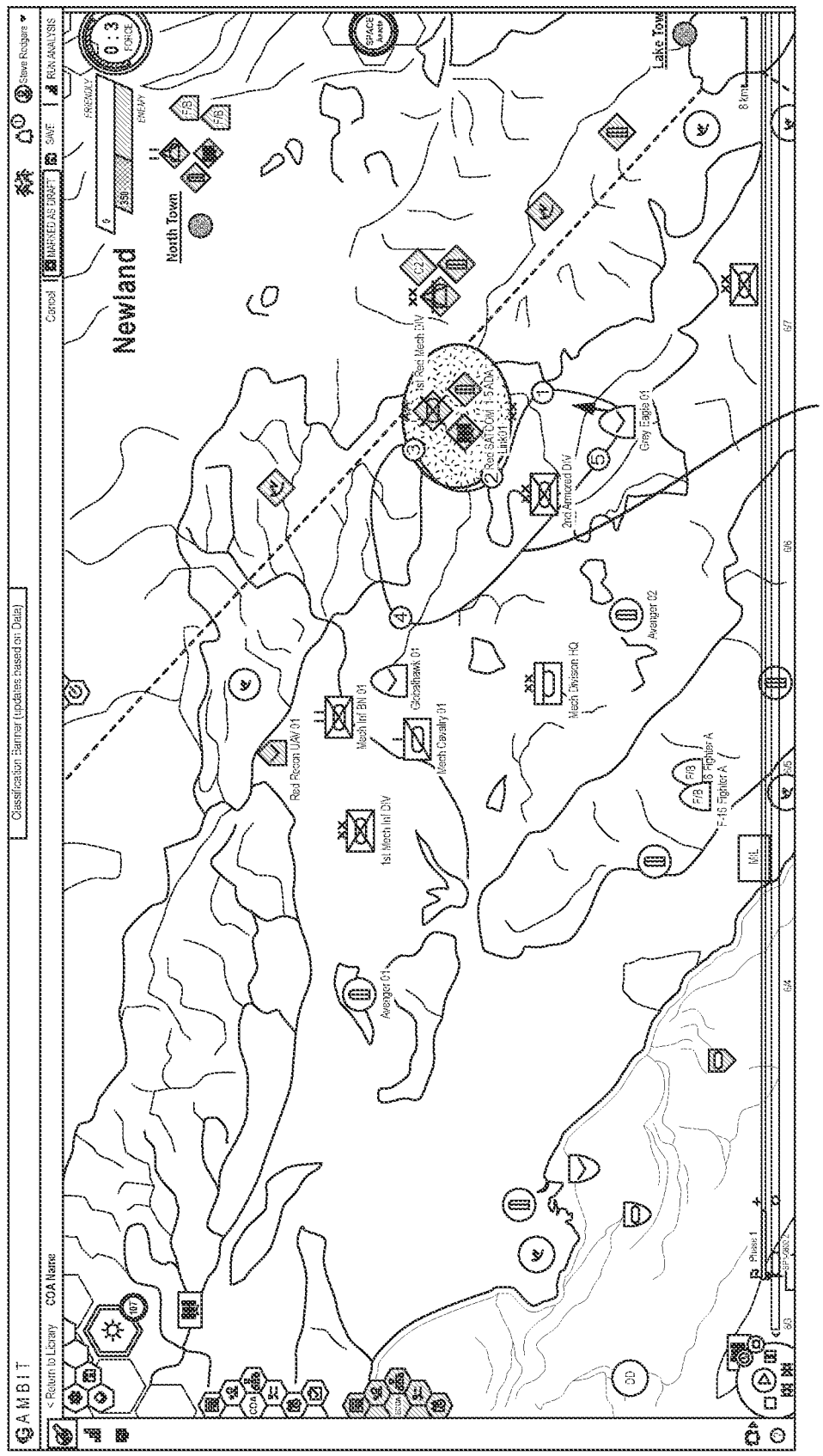
Figure 3J:
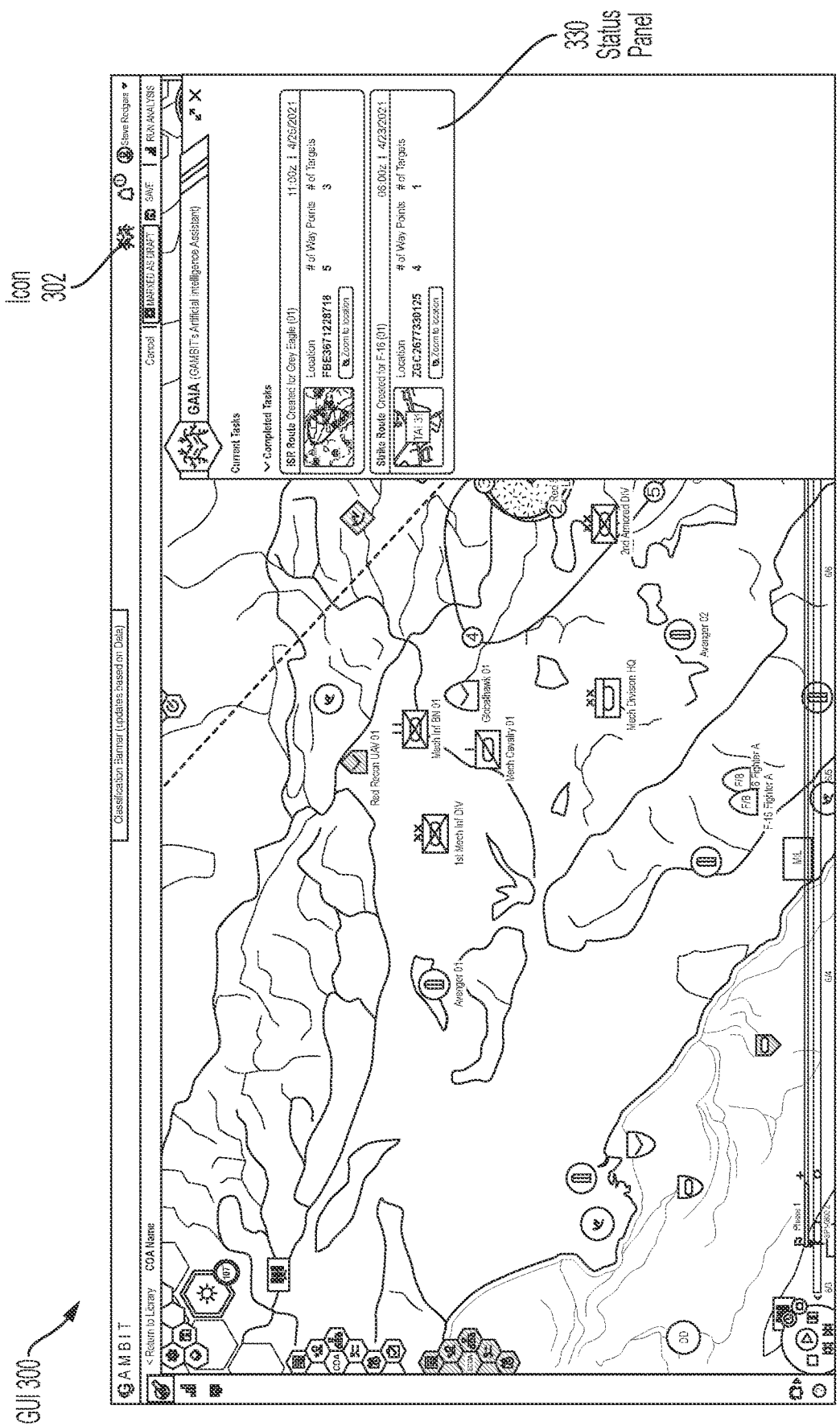

In FIG. 3I, the GUI 300 has been updated to reflect that the user has accepted the suggested route 336. Specifically, the strategic planning system updates the COA with the new route 336 and displays the route 336 on the map 304. The route 336 may remain on the map 304 unless the user chooses to hide or delete it. As shown in FIG. 3J, the user may select the icon 302 to return to the status panel 330 and view the current status of any ongoing and/or completed tasks. In this example, two tasks are shown. In addition, the status panel 330 may include controls (not shown) for filtering the tasks displayed in the status panel 330.

As described in further detail herein, the strategic planning system may perform unsupervised learning to adaptively update the existing COA, as the user's (e.g., commander's) intent objectives dynamically change during mission execution. Applying unsupervised learning helps support, for example, tactical operations that must adapt during the mission as the rules of engagement with the enemy change. The strategic planning system may assist the user by keeping the COA and associated models (for example, threat-effect pairings models) up-to-date, so that they can adapt to the time-critical dynamic changes of the tactical environment. Thus, the strategic planning system may significantly improve the user's ability to operate at maximum capacity throughout the mission execution.

Figure 3K:
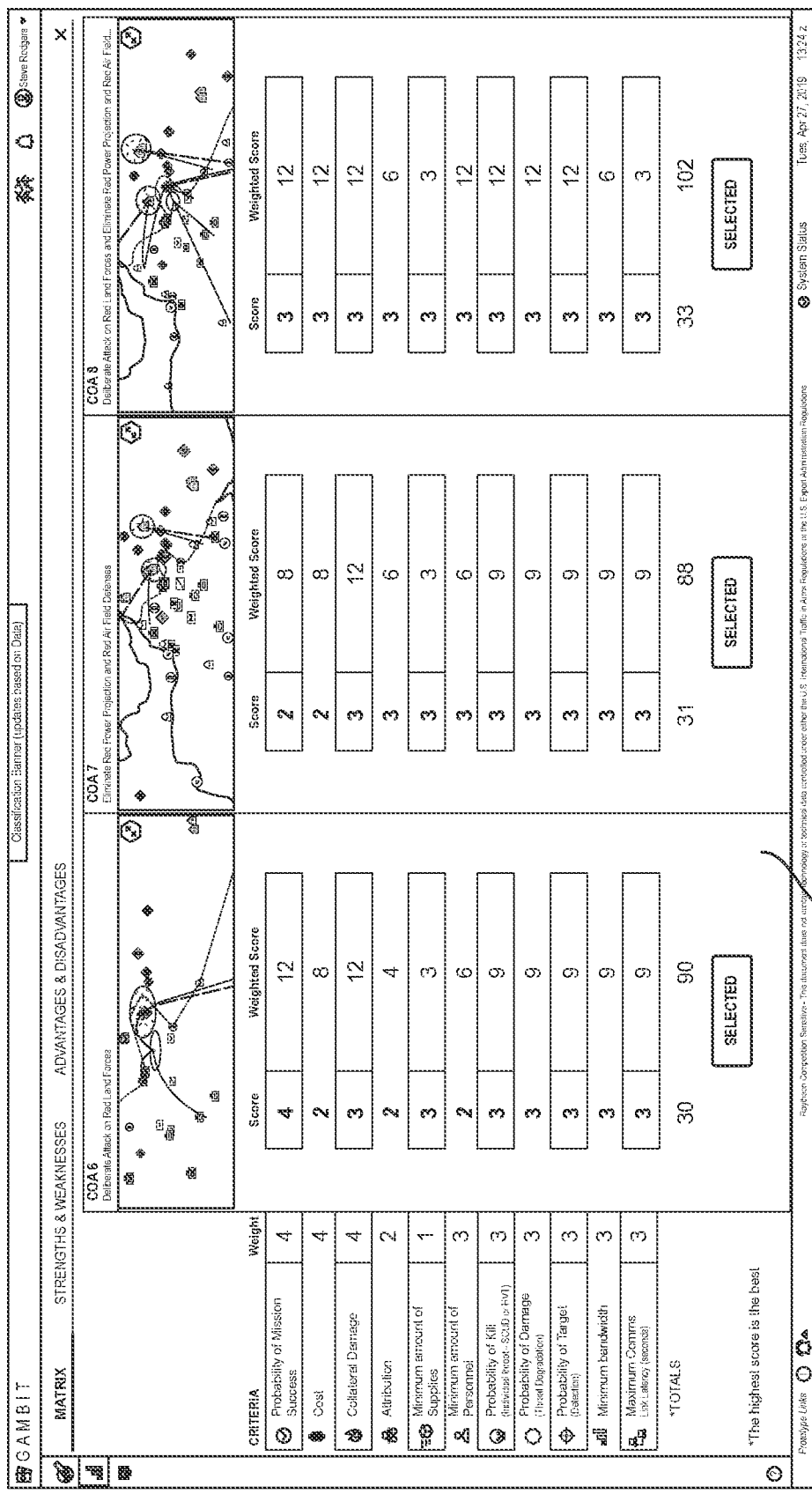

FIG. 3K illustrates an example of a user's (e.g., commander's) decision matrix 342 according to an embodiment. The decision matrix 342 provides a comparison of COA results based on mission metrics. The metrics may be weighted and scored according to the user's intent objective thresholds. The strategic planning system may apply these metrics to machine learning, for mission-specific COA selection decisions. In addition, the decision matrix 342 may provide visual validation of the machine learning results, improving the user's confidence in the strategic planning system's ability to support autonomous decisions.

VI. GENERAL; COMPUTER SYSTEMS; NETWORKING

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 4:
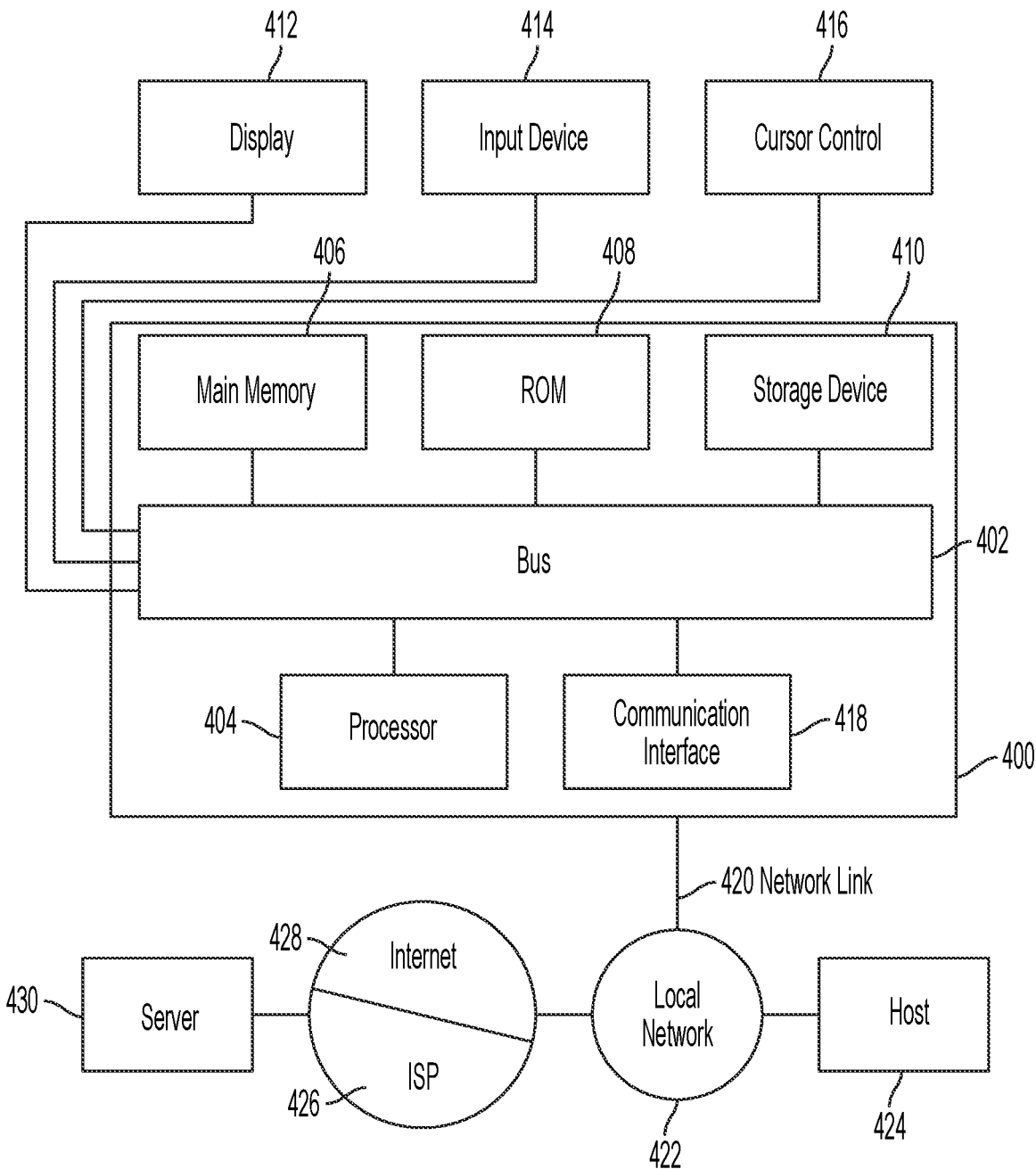
FIG. 4 is a block diagram of an example of a computer system according to an embodiment.

For example, FIG. 4 is a block diagram of an example of a computer system 400 according to an embodiment. Computer system 400 includes a bus 402 or other communication mechanism for communicating information, and a hardware processor 404 coupled with the bus 402 for processing information. Hardware processor 404 may be a general-purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in one or more non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), plasma display, electronic ink display, cathode ray tube (CRT) monitor, or any other kind of device for displaying information to a computer user. An input device 414, including alphanumeric and other keys, may be coupled to bus 402 for communicating information and command selections to processor 404. Alternatively or additionally, computer system 400 may receive user input via a cursor control 416, such as a mouse, a trackball, a trackpad, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. Alternatively or additionally, computer system 4 may include a touchscreen. Display 412 may be configured to receive user input via one or more pressure-sensitive sensors, multi-touch sensors, and/or gesture sensors. Alternatively or additionally, computer system 400 may receive user input via a microphone, video camera, and/or some other kind of user input device (not shown).

Computer system 400 may implement the techniques described herein using customized hard-wired logic, one or more ASICs or FPGAs, firmware, and/or program logic which in combination with other components of computer system 400 causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 402. Transmission media may also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 400 may receive the data from the network and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422, and communication interface 418.

The received code may be executed by processor 404 as it is received, and/or stored in storage device 410, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory computer-readable media storing instructions that, when executed by one or more processors, cause the one or more processors to perform operations comprising:
receiving first situational data from a first domain and second situational data from a second domain, the first domain and the second domain corresponding to different ones of land, sea, air, space, or cyberspace and the first situational data and the second situational data from different sensors in the first domain and the second domain, respectively;
presenting, by a graphical user interface (GUI), a map of geographical area associated with the first situational data and the second situational data;
receiving, by the GUI and from a user, a selection of an area of interest (AOI) on the map;
presenting, by the GUI and from the user, objectives that can be performed in the AOI;
receiving, by the GUI and from a user, first user input indicating an objective of the objectives selected by the user;
presenting, by the GUI, and responsive to receiving the objective, assets from a plurality of assets available in the first domain and the second domain;
receiving, by the GUI and from the user, a selection from the plurality of assets resulting in selected assets in the first domain and the second domain;
providing at least the first situational data, the second situational data, the selected assets in the first domain and the second domain, and the objective to a machine learning (ML) model;
receiving, from the ML model, suggested courses of action (COAs) for satisfying the objective using the selected assets;
presenting, by the GUI, the suggested COAs;
receiving, by the GUI and from the user, a selection of multiple COAs of the suggested COAs;
presenting, by the GUI, a comparison of COA results including scores for each of the selected COAs; and
implementing a COA of the selected COAs associated with a highest score.

2. The one or more non-transitory computer-readable media of claim 1, the operations further comprising:
during execution of the COA of the selected COAs, obtaining (a) third situational data from the first domain that is more recent than the first situational data and (b) fourth situational data from the second domain that is more recent than the second situational data;
applying at least the third situational data and the fourth situational data to the ML model to obtain a suggested adjustment to the COA; and
presenting the suggested adjustment to the COA in the GUI.

3. The one or more non-transitory computer-readable media of claim 1, the operations further comprising:
training the ML model to generate suggested courses of action that adhere to one or more military doctrines.

4. The one or more non-transitory computer-readable media of claim 1, the operations further comprising:
receiving second user input indicating a change in the first situational data;
applying at least the change to the ML model to obtain a modified suggested COA; and
presenting the modified suggested COA in the GUI.

5. The one or more non-transitory computer-readable media of claim 1, the objective comprising physical travel through a contested geographical area, the COAs comprising one or more respective routes through the contested geographical area.

6. The one or more non-transitory computer-readable media of claim 1,
the first situational data comprising live sensor data from one or more sensors in the first domain, and
the second situational data comprising live sensor data from one or more sensors in the second domain.

7. A system comprising:
at least one device including a hardware processor;
the system being configured to perform operations comprising:
receiving first situational data from a first domain and second situational data from a second domain, the first domain and the second domain corresponding to different ones of land, sea, air, space, or cyberspace and the first situational data and the second situational data from different sensors in the first domain and the second domain, respectively,
presenting, by a graphical user interface (GUI), a map of geographical area associated with the first situational data and the second situational data,
receiving, by the GUI and from a user, a selection of an area of interest (AOI) on the map,
presenting, by the GUI and from the user, objectives that can be performed in the AOI,
receiving, by the GUI and from a user, first user input indicating an objective of the objectives selected by the user,
presenting, by the GUI, and responsive to receiving the objective, assets from a plurality of assets available in the first domain and the second domain,
receiving, by the GUI and from the user, a selection from the plurality of assets resulting in selected assets in the first domain and the second domain,
providing at least the first situational data, the second situational data, the selected assets in the first domain and the second domain, and the objective to a machine learning (ML) model,
receiving, from the ML model, suggested courses of action (COAs) for satisfying the objective using the selected assets,
presenting, by the GUI, the suggested COAs,
receiving, by the GUI and from the user, a selection of multiple COAs of the suggested COAs,
presenting, by the GUI, a comparison of COA results including scores for each of the selected COAs, and
implementing a COA of the selected COAs associated with a highest score.

8. The system of claim 7, the operations further comprising:
during execution of the COA of the selected COAs, obtaining (a) third situational data from the first domain that is more recent than the first situational data and (b) fourth situational data from the second domain that is more recent than the second situational data;

applying at least the third situational data and the fourth situational data to the ML model to obtain a suggested adjustment to the COA; and presenting the suggested adjustment to the COA in the GUI.

9. The system of claim 7, the operations further comprising:

training the ML model to generate suggested COAs that adhere to one or more military doctrines.

10. The system of claim 7, the operations further comprising:

receiving second user input indicating a change in the first situational data;

applying at least the change to the ML model to obtain a modified suggested COA; and presenting the modified suggested COA in the GUI.

11. The system of claim 7, the objective comprising physical travel through a contested geographical area, the COAs comprising one or more respective routes through the contested geographical area.

12. The system of claim 7, the first situational data comprising live sensor data from one or more sensors in the first domain, and the second situational data comprising live sensor data from one or more sensors in the second domain.

13. A method comprising:

receiving first situational data from a first domain and second situational data from a second domain, the first domain and the second domain corresponding to different ones of land, sea, air, space, or cyberspace and the first situational data and the second situational data from different sensors in the first domain and the second domain, respectively;

presenting, by a graphical user interface (GUI), a map of geographical area associated with the first situational data and the second situational data;

receiving, by the GUI and from a user, a selection of an area of interest (AOI) on the map;

presenting, by the GUI and from the user, objectives that can be performed in the AOI;

receiving, by the GUI and from a user, first user input indicating an objective of the objectives selected by the user;

presenting, by the GUI, and responsive to receiving the objective, assets from a plurality of assets available in the first domain and the second domain, receiving, by the GUI and from the user, a selection from the plurality of assets resulting in selected assets in the first domain and the second domain, providing at least the first situational data, the second situational data, the selected assets in the first domain and the second domain, and the objective to a machine learning (ML) model;

receiving, from the ML model, suggested courses of action (COAs) for satisfying the objective using assets selected assets;

presenting, by the GUI, the suggested COAs;

receiving, by the GUI and from the user, a selection of multiple COAs of the suggested COAs, presenting, by the GUI, a comparison of COA results including scores for each of the selected COAs, and implementing a COA of the selected COAs associated with a highest score.

14. The method of claim 13, further comprising:

during execution of the selected COA of the COAs, obtaining (a) third situational data from the first domain that is more recent than the first situational data and (b) fourth situational data from the second domain that is more recent than the second situational data;

applying at least the third situational data and the fourth situational data to the ML model to obtain a suggested adjustment to the selected COA; and presenting the suggested adjustment to the selected COA in the GUI.

15. The method of claim 13, further comprising:

training the ML model to generate suggested COAs that adhere to one or more military doctrines.

16. The method of claim 15, further comprising:

receiving second user input indicating a change in the first situational data;

applying at least the change to the ML model to obtain a modified suggested COA; and presenting the modified suggested COA in the GUI.

17. The method of claim 13, the objective comprising physical travel through a contested geographical area, the suggested COAs comprising one or more respective routes through the contested geographical area.

* * * * *